United States Patent [19]
Levin et al.

[11] 3,809,341
[45] May 7, 1974

[54] DEVICE FOR REMOVING ICE FROM SURFACES OF THIN-WALLED STRUCTURES

[76] Inventors: Igor Anatolievich Levin, Petrozavodskaya ulitsa, 15, korpus 1, kv. 113; Anatoly Yakovlevich Levin, ulitsa Stepana Supruna, 12, kv. 74; Nikolai Evstigneevich Fedorov, Volokolamskoe shosse, 6, kv. 213; Iosif Alexandrovich Rogov, ulitsa Vostrukhina, 7, kv. 80; Erik Eduardovich Afanasov, ulitsa Baumanskaya, 26, kv. 4, all of Moscow; Eduard Grigorievich Turyansky, Noginsky raion, p/o Kupovka, ulitsa Matrosova, 11, kv. 52, Moskovskaya Oblast, all of U.S.S.R.

[22] Filed: Nov. 14, 1972

[21] Appl. No.: 306,554

[52] U.S. Cl. ............................... 244/134 R, 310/27
[51] Int. Cl. ............................................ B64d 15/16
[58] Field of Search ........ 244/134 R, 134 A, 134 D, 244/134 E; 310/10, 25, 27

[56] References Cited
UNITED STATES PATENTS
| | | | |
|---|---|---|---|
| 3,549,964 | 12/1970 | Leuin et al. | 244/134 A |
| 3,672,610 | 6/1972 | Levin | 244/134 R |
| 2,926,313 | 2/1960 | Wiegand | 310/15 |

Primary Examiner—Trygve M. Blix
Assistant Examiner—Gregory W. O'Connor
Attorney, Agent, or Firm—Waters, Roditi, Schwartz & Nissen

[57] ABSTRACT

Electric current pulses separated by time intervals are transformed into mechanical power pulses acting on a surface to be de-iced. A converter of electric current pulses is constituted by a pair of electrically connected conductors one of which mates intimately with the surface to be de-iced. The conductors are arranged in the area to be de-iced and disposed one beneath the other. The electric current flowing through the conductors cause their mutual repulsion or attraction whereby electric current pulses are transformed into mechanical power pulses thus causing an elastic deformation of the surface being de-iced and effecting the removal of ice from this surface.

7 Claims, 7 Drawing Figures

DEVICE FOR REMOVING ICE FROM SURFACES OF THIN-WALLED STRUCTURES

The present invention relates to improved surface cleaning devices in general, and in particular it relates to devices for removing ice from surfaces of various thin-walled structures. It may be used, for example, for de-icing ship sides, leading edges of aircraft, especially in supersonic aircraft, and helicopter blades. By leading edges of aircraft is meant the front portion of any aircraft part with respect to the flight direction such as the front portion of a wing, the empennage, an air intake, a blade of a jet engine, an air propeller, or an aerial. It is these areas that are especially subjected to icing in flight.

There is known in the art a de-icing device designed to remove ice from the surfaces of thin-walled structures by means of transforming electric current pulses separated by time intervals into mechanical power pulses and constituted substantially by wire loops connected to a current pulse source and located in close proximity to the walls to be de-iced so as to make the current induced by electromagnetic induction flow through these walls. Mechanical power pulses resulting from the interaction between the loop primary current and that induced in the walls will cause an elastic deformation of the surface being cleaned whereby ice is removed from this surface. In order to obtain a deformation of sufficient magnitude, an electromagnetic field of high intensity is required. This can be achieved by the use of large-sized wire loops which will sometimes cause difficulties and in some instances can even be unacceptable. Such a device cannot be used, for example, for de-icing the sharp leading edges of supersonic aircraft or the front edges of helicopter blades.

It is an object of the present invention to provide a less cumbersome device for removing ice from surfaces of thin-walled structures.

Another object of the present invention is to provide a device which will suit the purpose of removing ice from the surfaces of supersonic aircraft wings and from helicopter blades.

Still another object of the present invention is to provide a device for protecting thin-walled elements of a ship in the most cramped spaces such as masts.

We have been guided by the idea to provide a device for removing ice having a converter of electric current pulses into mechanical power pulses so embodied that it can be installed in small places.

This is achieved in that in a device for removing ice from surfaces of thin-walled structures having a converter of electric current pulses separated by time intervals into mechanical power pulses acting on the surface to be cleaned to achieve elastic deformation therein, according to the invention, the transformer has a pair of conductors electrically interconnected at their ends one side whereof is adjacent to the surface being cleaned in the area of de-icing, both conductors being located along this area one beneath the other in a direction opposite to the surface being cleaned in such a way that the current flowing through the conductors causes their relative displacement in a direction normal to the surface being cleaned thus providing for an elastic deformation of this surface.

An advantage of the present invention is that it provides for the possibility to use flat conductors which can be readily installed in cramped places instead of large size solenoids. The present invention is particularly advantageous when used for the purpose of removing ice from the front edges of supersonic aircraft wing, since flat conductors can be readily positioned along the wing leading edge.

When the present invention is used for removing ice from the wing leading edges of supersonic aircraft it is desirable to employ conductors in the form of flat buses of rectangular or trapezoidal section.

This increases the efficiency of the device since the gap between the conductors is maintained constant throughout the entire width thus providing for an even distribution of the elemental portions of current interaction and a protection of supersonic aircraft wings against icing in the narrowest places.

When the present invention is used for de-icing the front edges of supersonic aircraft wings, the framework carrying these edges may be made of a dielectric or conducting material.

In the case of a dielectric framework, there are provided grooves opposite one another on each wall to be de-iced, each groove receiving a flat bus electrically insulated from the surface to be de-iced.

In the case of a framework made of a conducting material, the grooves provided on each wall to be de-iced each house a pair of buses enclosed separately in insulating sheaths.

Additionally, according to another embodiment of the present device with a framework made of a conducting material having grooves, each groove receives a bus enclosed in an insulating sheath whereas the framework itself is connected to the circuit of each bus whereby each bus forms a converter together with the framework.

In another of the embodiments of the present invention, a slot is provided in the framework and the edge to be protected normal to the chord of the latter houses conductors attached to the framework, which conductors are made in the form of flat plates, the outer surface whereof coincides with the theoretical contour of the aircraft surface to be de-iced.

In another embodiment, a slot provided in the framework and disposed in the chord plane subdivides the framework into two parts each serving as a conductor and in combination making up a converter, one part of the framework being insulated from the outer covering whereas the other part is in contact with the electric mass of the aircraft along the entire length thereof only with its central portion.

This allows for decreasing the weight and size of the device for removing ice from the wing surface, as the converter is in this case is formed solely by the elements constituting that part of the aircraft which is to be de-iced.

The invention will now be explained in greater detail with reference to embodiments thereof which are represented in the accompanying drawings, wherein.

Figure 1:
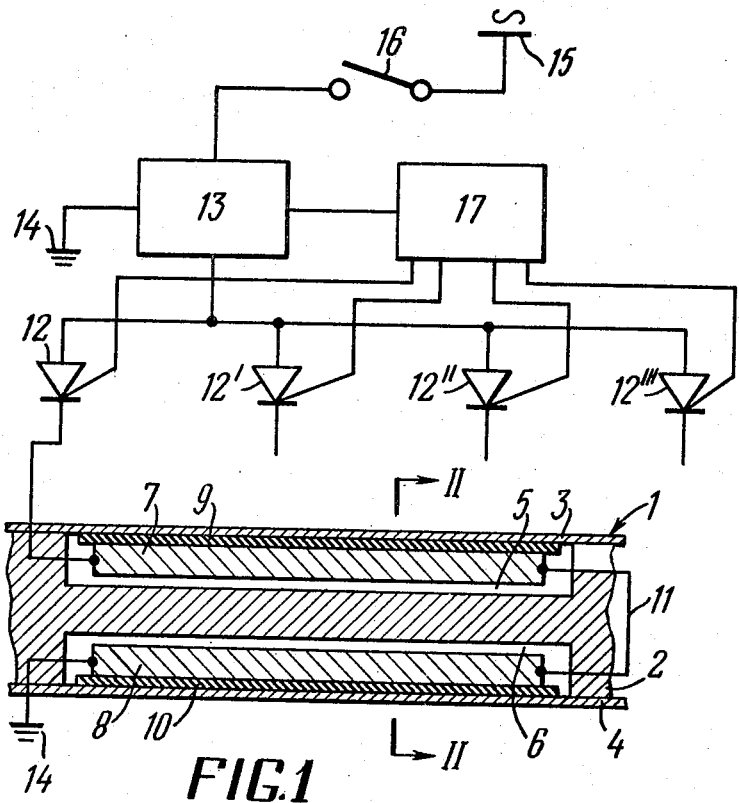
FIG. 1 is a longitudinal section of a supersonic aircraft wing in the area of installation of the converter of electric current pulses into mechanical power pulses connected to a current source.
Figure 2:
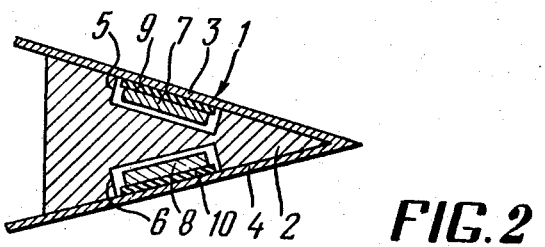
FIG. 2 is a cross-section of FIG. 1 on the line II—II.

Now referring to FIGS. 1 and 2, a stringer 2 made of a dielectric material disposed inside the sharp leading edge of an aircraft wing 1 (the aircraft is not shown) has, on its sides opposite coverings 3 and 4, grooves 5 and 6 extending along the leading edges to be de-iced and symmetrically disposed with respect to the wing chord. Electric conductors made of aluminum in the form of flat buses 7 and 8 fitted in the grooves have each a rectangular section. The buses 7 and 8 are electrically insulated by means of spacers 9 and 10 from the coverings 3 and 4 respectively and interconnected by one end via a conductor 11. The buses 7 and 8 are arranged one beneath the other in a direction opposite to the outer coverings 3 and 4 to be de-iced and fixed by any appropriate technique such as riveting to the inner sides of the coverings coverings and 4. The opposite end of the bus 7 is connected through a thyristor 12 to an electric current pulse source 13 whereas the opposite end of the bus 8 is connected to the mass 14 of the aircraft. Thus, the buses 7 and 8 are connected in series. Any conventional electric current source may serve as the pulse source 13 provided it generates pulses separated by time intervals, the time interval between the pulses being at least 10 times as long as the pulse duration.

The pulse source is fed from an airborn AC power supply system 15 through a switch 16. It has been known that the repulsive force F per unit length $l$ of two parallel conductors spaced apart by a distance $a$ with electric currents flowing through each of them in opposite directions, is determined from the following formula:

$$F/l = k\, I_1 I_2/a,$$

where $k$ is a factor depending on the properties of the material interposed between the conductors as well as on the shape of these conductors, $I_1$ and $I_2$ are the currents flowing through the conductors.

Thus, the buses 7 and 8 make up a converter of electric current pulses into mechanical power pulses.

For practical purposes, aircraft should have a plurality of such converters and the power supply system, therefore, must comprise a programming commutator 17 operating thyristors 12, 12', 12" and 12''' connected separately to the supply circuit of each converter.

Ice is removed from the aircraft wing covering in the following manner. Whenever the aircraft enters an icing zone the switch 16 is closed automatically or manually thus causing the source 13 to generate electric current pulses. The commutator 12 consecutively opens the thyristors 12, 12', 12", and 12''' and the pulses pass sequentially to the converters. Electric pulses passing across the buses 7 and 8 give rise to the aforesaid repulsive forces.

For simplicity, hereinafter, the operation of only one of the converters will be considered. Since the buses 7 and 8 are adjacent to the coverings and the mechanical pulses are separated by time intervals, the elastic deformation occuring in each covering will be sufficient to remove ice forming on the surface thereof, said deformation depending largely on the repulsive force F, the properties of the stringer material and the elasticity of the wing structure.

It should be noted that the repulsive force F should be chosen such that the mechanical stress occurring in the covering not be in excess of the fatigue or cyclic stress limits of this covering.

FIGS. 3 to 7 show various different embodiments of the invention.

Figure 3:
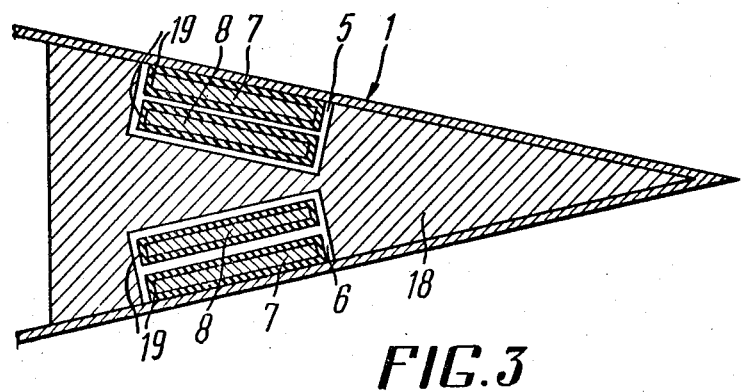
FIG. 3 is a cross-section of an aircraft wing leading edge wherein the converter is installed.

In the embodiment shown in FIG. 3, the stringer 18 is made of a metal with grooves 5 and 6 each housing a pair of flat buses 7 and 8. The bus 7 is fixed to the wing covering I by any appropriate means whereas the bus 8 is attached to the stringer 18 (mounting elements not shown). Each bus is enclosed in an insulating sheath 19. The buses 7 and 8 of each pair are interconnected by one end. Each pair of buses 7 and 8 constitutes a converter of electric current pulses into mechanical power pulses acting upon the covering being protected and is connected to the power supply source in the same manner as the converter shown in FIGS. 1 and 2. The buses 7 and 8 may be simply placed in the grooves slightly spaced apart rather than fixed to the covering or to the framework.

Figure 4:
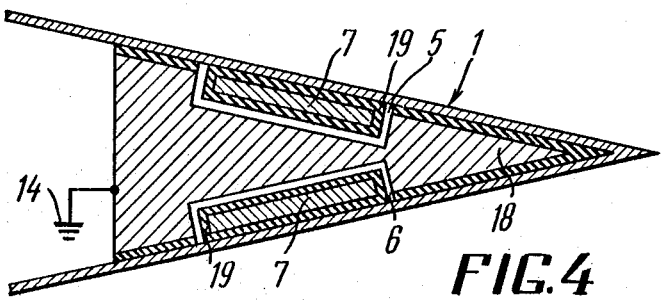
FIG. 4 is a cross-section of an aircraft wing leading edge wherein the converter is installed with one of the buses constituted by a stringer.

Shown in FIG. 4 is an embodiment of a converter with the metallic stringer 18 serving as one of the buses. Grooves 5 and 6 provided on the stringer each house a bus 7 enclosed in an insulating sheath 19. One end of the stringer 18 is in electric contact with the mass 14 of the aircraft whereas its opposite end is in contact with each one of the buses 7.

Figure 5:
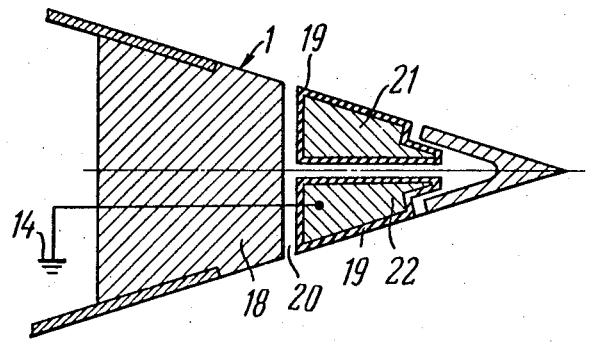
FIG. 5 is a cross-section of an aircraft wing leading edge wherein the converter is attached to the stringer.

Shown in FIG. 5 is another embodiment of a converter for a supersonic aircraft with the leading edge being so sharp that the wing does not reach it. In this case, fitted in a slot 20 provided in the stringer 18 normal to the aircraft chord are two buses 21 and 22 which are, like the buses 7 and 8, electrically interconnected. The buses 21 and 22 have a trapezoidal section and their outer contour coincides with the theoretical contour of the aircraft wing. Adequate fixing elements (not shown) are provided to retain the buses in place.

In this particular embodiment, it may be preferred to have the buses connected in parallel to the source of electric current pulses (not shown) for which purpose the source is connected to the point where the buses are electrically connected to one another and their opposite ends are connected to the electric mass of the aircraft.

Consequently, the current in one bus flows in a direction opposite to that in the other bus and as a result of the interaction of these currents one conductor is attracted to the other by a force F defined from the aforementioned formula. The conversion of electric current pulses into mechanical power pulses is effected in a way similar to that described above the only difference being that this conversion is effected due to the attractive force. Because of its compactness, this particular embodiment is especially adapted for removing ice forming over the sharpest edges of aircraft parts such as the empennage or the air intake.

Figure 6:
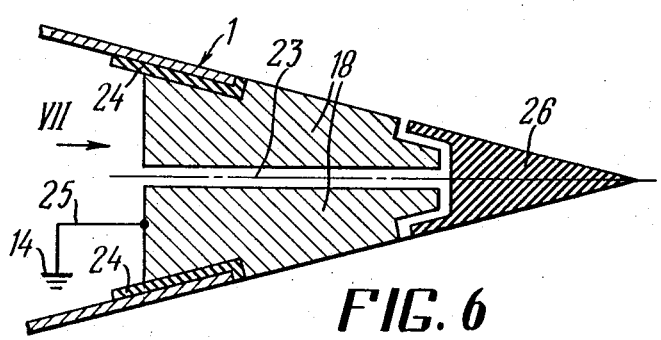
FIG. 6 is a cross-section of a supersonic aircraft wing leading edge with the converter formed by the stringer.
Figure 7:
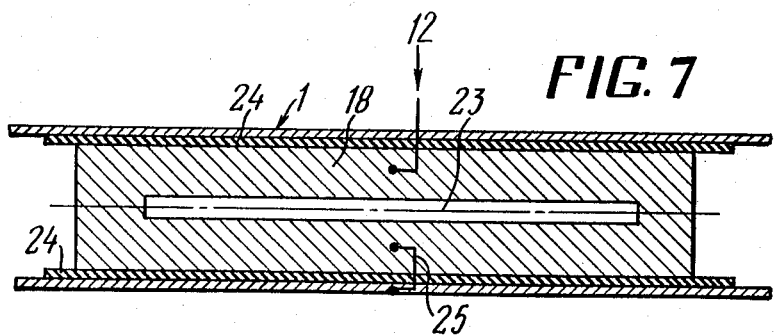
FIG. 7 is a cross-section of the wing leading edge of FIG. 6 as seen in the direction of line VII in FIG. 6.

Referring to FIGS. 6 and 7, a passage 23 extending along the chord subdivides the stringer 18 of the wing 1 into two parts. One part of the stringer 18 is electrically insulated from the wing covering whereas the other part is connected, by its central portion, to the wing covering. Spacers 24 made of a suitable insulating material are designed to electrically insulate the stringer 18 from the covering. On the other hand, conductor 25 serves to ensure the electric contact between the stringer 18 and the covering. A cap 26 made of a suitable insulating material is designed to keep the air off the passage 23. When such a converter is connected to a current source, one part of the stringer serves as the bus 7 while the other part constitutes the bus 8. Under the influence of the currents flowing across the aforesaid parts of the stringer, these parts tend to push away from each other resulting in an elastic deformation whereby ice is chipped off from the surface being cleaned.

What is claimed is:

1. A device for removing ice from surfaces of thin-walled structures by an elastic deformation of said surfaces, said device comprising: an electric current source for generating electric current pulses separated by time intervals whose duration exceeds that of said pulses, a converter means for converting said pulses into mechanical power pulses, said converter means including a pair of electrically connected conductors one of which mates with the wall of the surface being de-iced in the area of de-icing, both conductors being arranged along said area one beneath the other and connected to said electric current source such that the currents flowing through the conductors causes their relative displacement in a direction normal to the surface being de-iced thus providing for a mechanical interaction between the conductors and the wall whereby ice is removed from said surface.

2. A device as claimed in claim 1 for removing ice from the leading edges of aircraft parts wherein the conductors are in the form of flat buses of rectangular or trapezoidal section.

3. A device as claimed in claim 2 comprising an edge framework of dielectric material provided with on each wall to be de-iced, grooves opposite one another, each housing a and conductor electrically insulated from the wall to be protected.

4. A device as claimed in claim 2 comprising an edge framework of dielectric material provided with on each wall to be de-iced grooves, each housing a pair of conductors enclosed separately in an insulating sheath.

5. A device as claimed in claim 2 comprising an edge framework of conducting material provided with on each wall to be de-iced grooves, each housing a conductor enclosed in an insulating sheath, said framework being connected to the electric circuit of each conductor so as to make up, in combination with each conductor, said converter means.

6. A device as claimed in claim 1 wherein, in order to remove ice from the leading edge of supersonic aircraft parts in the uncovered area there is provided a framework with a slot, said conductors being in said slot and in the form of flat buses whose outer contour coincides with the theoretical contour of the aircraft surface to be protected.

7. A device as is claimed in claim 1 for removing ice from the leading edges of supersonic aircraft parts, comprising a framework having a slot arranged in the chord plane dividing said framework into two parts each serving as a conductor both forming a converter one part of the framework being completely insulated from the surface to be protected whereas the other part is in electric contact with the mass of the aircraft only with its central portion.

* * * * *